April 17, 1951        J. W. COLES        2,548,950
AUTOMOBILE CLOSURE STRUCTURE
Filed April 19, 1946
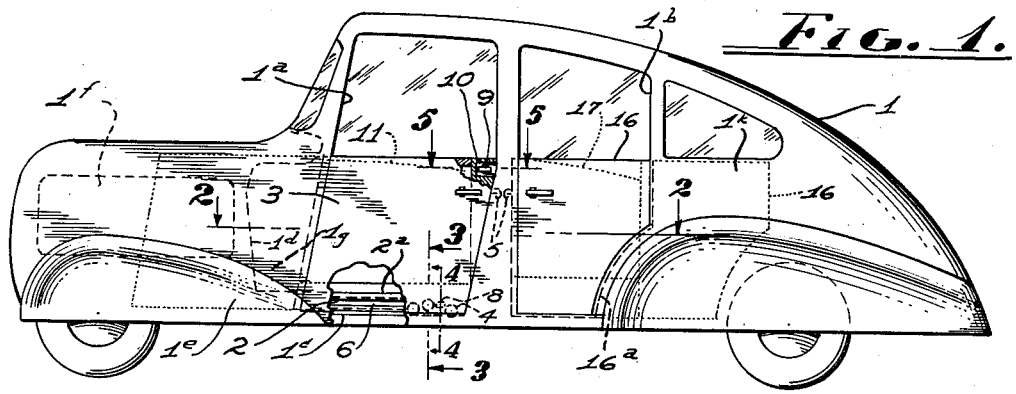
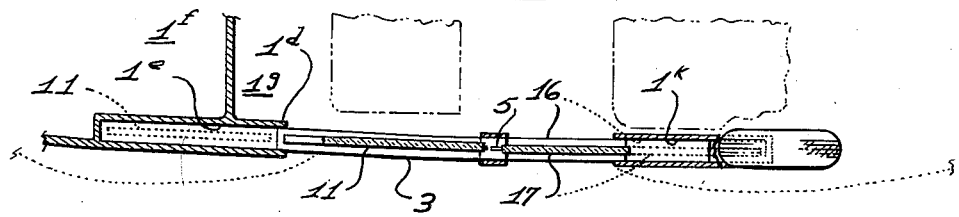
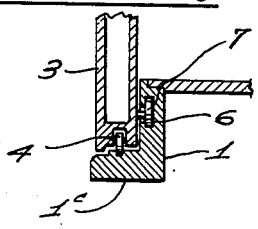 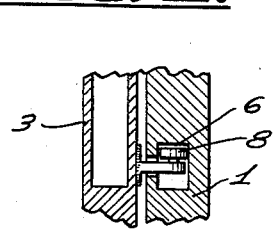 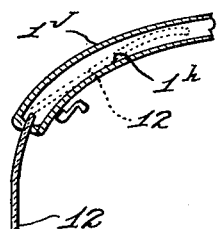
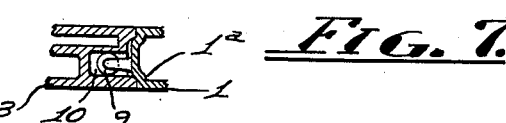
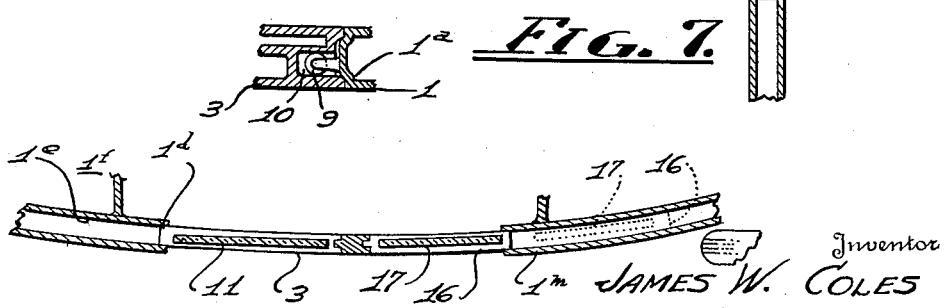
Inventor
JAMES W. COLES
By William B. Hall
Attorney Patented Apr. 17, 1951

2,548,950

UNITED STATES PATENT OFFICE 2,548,950

AUTOMOBILE CLOSURE STRUCTURE

James W. Coles, Santa Ana, Calif.

Application April 19, 1946, Serial No. 663,570

3 Claims. (Cl. 296—47)

My invention relates to automobile closure structures, and more particularly to sliding doors for automobiles.

One of the principal objects of this invention is to provide a horizontal sliding door structure for vehicles, and particularly for private passenger automobiles, in which the door may be shifted clear of the entrance and exit opening at the side of the vehicle body by moving the door forwardly alongside the body wall and particularly at the outer side of or laterally outwardly from the engine or other forward compartment of the automobile.

Another important object of this invention is to provide a door of this class for receiving the window normally located above the door, and in which the window may be moved laterally with the door.

An important object also of this invention is to provide such a door and window construction in which the window, after being lowered into the door, may be moved forwardly with the door to the side of the engine or other forward compartment of the automobile.

Another important object of this invention is to provide novelly mounted and arranged rear sliding doors for automobiles.

Still another important object of this invention is to provide novel means for slidably supporting the lower portion of a sliding door so that it is rigidly supported in its closed, open, and intermediate positions.

A further important object of this invention is to provide a sliding door construction for automobiles, which is simple and economical, whereby the doors may be easily and separately operated, and a structure which will not readily deteriorate or get out of order.

With these and other objects in view, as will appear hereinafter, I have devised a sliding door construction for automobiles having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1 is a side elevational view of a passenger automobile embodying my invention in one form, portions thereof being broken away to facilitate the illustration;

Figure 2 is an enlarged fragmentary sectional view thereof in plan, taken through 2—2 of Fig. 1, showing the relation of the doors at one side and the compartments in the side wall of the automobile body for receiving the doors when opened;

Fig. 3 is an enlarged fragmentary sectional view thereof, taken through 3—3 of Fig. 1, showing the mounting of one of the doors with respect to the running board and chassis of the automobile;

Fig. 4 is an enlarged fragmentary sectional view, similar to Fig. 3, but showing the relation of the door with respect to the chassis of the automobile to prevent lateral movement of the door, the section being taken through 4—4 of Fig. 1, slightly behind the line indicating the portion through which section 3—3 is taken;

Fig. 5 is an enlarged sectional view, taken through 5—5 of Fig. 1, showing a means of securing the free upper end of the door, when closed, to the body.

Fig. 6 is a sectional view in plan, similar to that shown in Fig. 2 but with the embodiment in an automobile body having greater front and rear curvature in side walls; and, Fig. 7 is an enlarged vertical sectional view of a modified form of my invention, showing a mounting of the window above the door whereby the window may be raised above the door and into the top of the automobile.

In modern automobile construction, considerable space is unused because of the bulky construction of the body. Considerable unused space is provided in the body immediately to the side and rear portion of the engine compartment, or the sides of the foot space of the front compartment. I have designed a door construction which utilizes such normally waste space.

The automobile body, designated 1, is mounted on the usual chassis or frame 2. The body has either one or two door openings, designated here as $1^a$ and $1^b$. These openings extend near and often through the bottom portion of the body. The bottom edge $1^c$ of the opening is positioned a considerable distance below the upper portion $2^a$ of the frame, or of the floor of the passenger compartment, and may serve as a running board. In the lower portion of the opening $1^a$ is mounted a door 3. This door is shown as supported upon rollers 4 at its lower edge which rollers ride in a groove or track on the running board $1^c$, as shown in Figs. 1 and 3. The forward end of the door preferably remains located within the rear portion of a pocket $1^d$ or hollow side wall $1^e$ of the body. This pocket is located to one side of the engine compartment $1^f$ and of the foot space $1^g$ within the body. When the door is shifted forwardly into the pocket $1^d$, the opening $1^a$ is wholly clear of the door. The rear edge of the door may have a latch 5 for locking the door in a closed position.

In order to stabilize the door in intermediate positions, there is preferably provided a track 6 alongside the frame 2, preferably immediately below the floor line 2a, and in this track, which is preferably T-shaped, extend rollers 7 and 8, which are shown as mounted on horizontal and vertical axes. These rollers rigidly locate the door.

On the body, near the rear edge of the opening 1a, may be provided another roller 9 on a vertical axis, which may enter a recess member 10 at the upper portion of the door, to facilitate the alignment of the upper portion of the door when the same is shifted to its closed position and for fixedly locating such upper portion.

The door 3 is made hollow for receiving a window 11, normally extending above the door for closing the window opening of the body. This window may be lowered into the door in the normal manner, and when so lowered the window may be shifted with the door 3 into the pocket 1d in the side wall of the body.

In Fig. 7 of the drawings, I have shown a window 12 which may be shifted out of the way by raising the same into a hollow portion 1h in the top 1j of the body.

In automobiles, in which the propelling engine is located in the rear, the door 3 is moved into a pocket or space which is located at the side of any other compartment at the forward end of the automobile.

The rear opening 1b of the body also has a door 16, which may be shifted backwardly into a pocket 1k in the side wall of the body. This compartment may be located wholly in front of the wheel of the automobile, as shown in Figs. 1 and 2. If the space is limited, the lower rear portion of the door may be inclined, as indicated by 16a.

The rollers 4, 7, 8, and 9, and other associated or necessary parts, shown in connection with the front doors, are typical, and may be employed on the rear doors, these features not being illustrated in the drawings.

If permitted by the contour of the body of the automobile, as shown fragmentarily in Fig. 6, the rear door 16 may be shifted backwardly into a pocket 1m located inwardly of the rear wheel.

The window 17 of the rear door may also be lowered into a compartment of the rear door 16, or it may be raised into a compartment in the top, as described above.

Though I have shown and described a particular construction, combination, and arrangement of parts and portions, and certain modifications thereof, I do not wish to be limited to the same, but desire to include in the scope of my invention the construction, combination, and arrangement substantially as set forth in the appended claims.

I claim:

1. In an automobile, a body provided with an engine compartment at its forward end and a door opening at the side behind the compartment, the wall at the side of the compartment, forwardly of the door opening, being hollow, a door slidably mounted in the opening and adapted, when uncovering the opening, to be shifted forwardly from the opening into the hollow wall, said door being hollow and provided with a slit in its upper edge, and a window so mounted on the door as to be capable of being lowered through the slit into the hollow door, and adapted to be moved with the door clear of the opening in the body.

2. In an automobile, a body provided with a compartment at its forward end and a door opening at the side adjacent the compartment, a door slidably mounted relative to the opening and normally closing the lower portion thereof, said door being adapted to be shifted longitudinally from the opening into said compartment to uncover said lower portion of the opening, and a window positioned within the upper portion of the opening, said window being slidable vertically in said opening and normally closing the upper portion thereof, the lower edge of said window, when the latter is in said normal position, engaging the upper portion of the door to retain the latter in position to cover said opening, said window being slidable vertically to a position wherein its lower edge disengages the upper portion of said door so as to allow horizontal slidable movement of the door into said compartment.

3. In an automobile, a body provided with a door compartment at its forward end and a door opening at the side adjacent said compartment, said body having a top, a window compartment in said top and a slit at the side of said top communicating with said window compartment, a door slidably mounted on said body and normally closing the lower portion of said opening, said door being adapted to be slid laterally from the opening into said door compartment, and a vertically slidable window normally disposed in the upper portion of said opening and closing the same, said window being slidable upwardly through said slit into said window compartment so as to open said upper portion of the opening.

JAMES W. COLES.

REFERENCES CITED

The following references are of record in the file of this patent:

UNITED STATES PATENTS

| Number | Name | Date |
|---|---|---|
| 527,806 | Pile | Oct. 23, 1894 |
| 1,274,872 | Gordon | Aug. 6, 1918 |
| 1,712,588 | Small | May 14, 1929 |
| 1,714,599 | Hardtke | May 28, 1929 |
| 2,020,817 | Wexelberg et al. | Nov. 12, 1935 |

FOREIGN PATENTS

| Number | Country | Date |
|---|---|---|
| 310,626 | Great Britain | May 2, 1929 |